Aug. 4, 1931.   I. R. McGOWEN ET AL   1,817,090
ELECTRICAL WATER HEATING DEVICE
Filed June 18, 1928
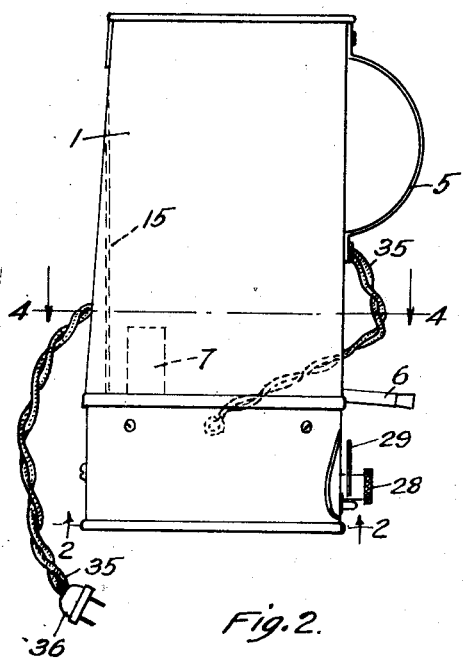
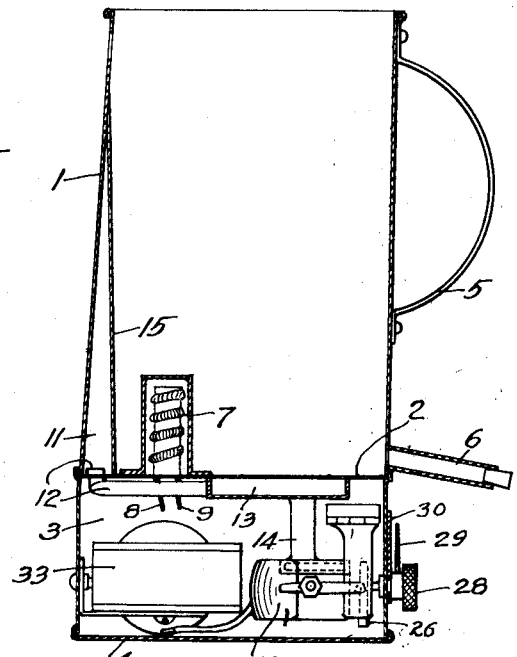
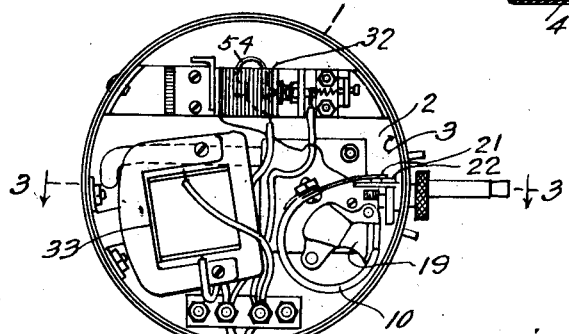
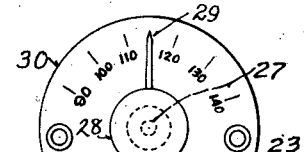
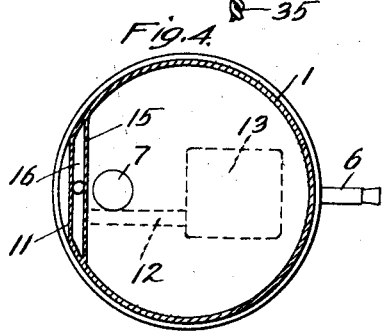
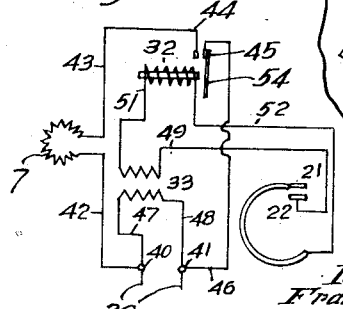
INVENTOR.
Ida R. McGowen
Francis J. McGowen.
BY Arthur P. Knight
Alfred W. Knight
ATTORNEYS.

Patented Aug. 4, 1931

1,817,090

UNITED STATES PATENT OFFICE

IDA R. McGOWEN AND FRANCIS J. McGOWEN, OF SAN PEDRO, CALIFORNIA

ELECTRICAL WATER HEATING DEVICE

Application filed June 18, 1928. Serial No. 286,216.

This invention relates to electrical water heating devices and particularly to an electrical heating means for douches or similar devices which are intended to supply a limited quantity of water or other liquid at approximately uniform temperature. In the patent to Ida R. Forbes No. 1,251,240, dated December 25, 1917, a device of this character is disclosed and the main object of the present invention is to provide in connection with such a device improved means for controlling the operation of the electrical heating means responsively to the temperature of the liquid in the receptacle. A further object of the invention is to provide a self-contained unit in which the heating and controlling means are carried by and form a part of the douche or other water heating device.

The accompanying drawings illustrate an embodiment of our invention and referring thereto.

Fig. 1 is a side elevation of the douche.

Fig. 2 is a section on line 2—2 in Fig. 1.

Fig. 3 is a section on line 3—3 in Fig. 2.

Fig. 4 is a section on line 4—4 in Fig. 1.

Fig. 5 is a side elevation of a manually operated contact controlling device.

Fig. 6 is an elevation of the manually controlled means for adjusting the operation of the thermostatic control means.

Fig. 7 is a diagram of the circuit connections.

The improved electrical water heater may comprise a receptacle or container 1, formed for example of sheet metal, and open at the top, said receptacle having a bottom 2 spaced sufficiently above the lower edge of the side wall of the receptacle to provide an interior space or chamber 3 below said bottom for reception of the circuit controlling devices as hereinafter set forth. Said chamber 3 may be closed at the bottom by a closure means 4. The container 1 may have a handle 5 and a delivery tube or outlet 6, for conducting the heated water, by means of a flexible tube or otherwise, to the place where it is to be used.

A heating element 7 is provided for heating the water in the container 1, said heating element being of any suitable construction and being located in any suitable position where it is adapted to heat the liquid in the container 1, said heating element for example projecting up from the bottom of container 1 and being connected by wires 8 and 9 to an energizing electrical circuit hereinafter described.

A thermostatic control means is provided for the energizing circuit referred to, said control means comprising a pressure responsive device 10 and a chamber 11 in proximity to the container 1 so as to be heated by the liquid contents thereof, said chamber 11 communicating with the pressure responsive means for example through passage means indicated at 12, 13 and 14.

The chamber 11 is preferably formed so as to extend through a considerable portion of the height of the can or container 1 and it is advantageously formed by attaching a sheet metal plate 15 to the interior of the container 1, said plate extending from the bottom 2 to nearly the top of the container, and being soldered or otherwise hermetically connected to the wall of the container so as to form a chamber 11 between said plate and the wall of the container, said chamber being of relatively small thickness, but presenting considerable wall area to the liquid contents of container 1 and to the outside air so that the same may be rapidly responsive to changes of temperature of the liquid in the container.

The pressure responsive device 10 may consist of a hollow body bent in arc shape and communicating at one end through a hollow arm 19 with passage means 14 aforesaid, said passage means being formed as a tubular post supporting the arm 19 which carries the arc shaped hollow member 10. At its free end the said member 10 carries a contact 21 adapted to make connection with an adjustable contact 22 to close the electric circuit for the heating device. Said contact 22 may be adjusted by any suitable means, for example, it may be carried by an arm 22' pivoted at 23 on an insulated support 24 and connected to a spring 25 which holds it in contact with an adjusting cam or eccentric 26, said cam 26 being carried by a shaft 27 extending through the wall of the chamber 3 aforesaid and provided exteriorly of the douche with an operating knob or handle 28 and a pointer 29 which may read on suitable thermometric scale means 30.

The pressure responsive means 10 is included within the wall of the said chamber 3 and we also prefer to enclose within said wall, an electromagnetic relay device 32 for controlling the operation of the heating means. The coil of said relay device is connected to the secondary winding of a transformer 33 also preferably contained within the chamber 3, the primary winding of said transformer being connected to wires 35 which are in turn connected to terminals of a suitable plug 36 adapted for connection to an electric service circuit in well known manner.

An automatically self-closing valve indicated at 37 may be provided for the chamber 13 so that by temporarily opening said valve the pressure in the chamber may be equalized with that of the outer air or if desired compressed air or other gas may be supplied through said valve to the air chamber 11 and its connections. Said valve 37 may be of any suitable construction adapted to open inwardly and to close outwardly automatically by spring pressure or otherwise, being for example, similar to the valves used for automobile tires.

Fig. 7 shows the electrical connections for the parts described, the connections from the operating circuit by means of the wires of the flexible cord 38 being made to terminals 40 and 41. From terminal 40 a wire 42 leads to the heating element 7 and from said heating element a wire 43 leads to a contact 44 operated by the relay 32, the other contact 45 for said relay being connected by wire 46 to the terminal 41. Another wire 47 leads from terminal 40 to one side of the primary winding of transformer 33, the other side of said primary winding being connected by wire 48 to terminal 41. The secondary winding of said transformer 33 is connected at one side by wire 49 to contact 22 of the thermostatic device and at the other side by wire 51 to the winding of the electromagnetic relay 32, the other side of which is connected by wire 52 to the other contact 21 of the thermostatic device.

The operation is as follows. Water or other liquid after having been placed in the container or receptacle 1 and the outlet 6 being closed by any suitable closure means located, for example, on the delivery tube connected thereto, the plug 36 is put in connection with any suitable service socket, and alternating current from the service line passes through the connections 38, 47 and 48 to the primary of the transformer 33. Current flows from the secondary winding of transformer 33 to wire 51, coil of relay 32, wire 52, contacts 21 and 22, and wire 49, the pressure responsive device being adapted to close the circuit at contacts 21 and 22 except when it is operated under increase of pressure due to heating of the water to the proper temperature, the relay 32 being energized by passage of current therethrough closes the circuit with contacts 44 and 45 so that current flows from the terminal 40 to wire 42 to resistance element 7, then to wire 43, contacts 44 and 45, and wire 36 to terminal 41 thus energizing the heating elements and causing the temperature of the water or liquid in the container 1 to rise. As the temperature of the water increases the corresponding increase in temperature of the air within the chamber 11 is effected with the result that an increased pressure is transmitted through the connections 12, 13 and 14 to the interior of the curved tubular member 10 causing the same to tend to straighten out and eventually to open circuit at contacts 21 and 22 so as to interrupt the energizing circuit for the winding of relay circuit 2. It will be noted that this energizing circuit for the relay is operated from the secondary of transformer 33, said transformer being adapted to step down the potential difference from that of the ordinary service circuit, say 110 volts, to a voltage adapted for operation of relay 32 and for interruption by slowly moving contact device such as shown at 21. For example, the voltage in the secondary circuit including the coil of relay 32 and contacts 21 and 22 may be about six volts. When the relay 32 is de-energized by breaking of circuit 1 at contacts 21 and 22 it opens the circuit of contacts 44 and 45 for the heating unit or element 7 so that current ceases to flow in the heating unit. This cut off operation may be regulated by adjustment of the cam means 26 which moves the contact point 22 toward or from the contact 21 so as to determine the temperature at which the cut off device will operate.

It will be noted that the air chamber 16 extends substantially throughout the height of the container, that is from the bottom of the container 1 nearly to the top thereof so that it is in heat conducting or receiving relation with the body of liquid in the container substantially throughout the height of such body and is therefore responsive to the average temperature of the liquid in the container. Moreover, said chamber 16 has a relatively extended area of wall exposed to the liquid and a relatively extended area of wall exposed to the outer air, whereas the transverse dimensions or thickness of said air chamber is relatively small, and by reason of this construction the air chamber is quickly responsive, both to increase in temperature of the liquid, and to decrease in temperature of the liquid in the container, the large wall area exposed to the liquid giving a quick response to heating of the liquid and the large wall area exposed to the outer air giving a quick response to cooling of the liquid. In order to provide for an effective contact controlled by the relay device I prefer to mount the fixed contact 45 of the relay on a spring 54 as indicated, the movable contact 44 being mounted on the armature of the relay.

We claim:

1. An electrical heating device for liquids comprising a container having a wall member extending adjacent a side wall member of the container so as to form an air chamber between said wall members, the distance between said wall members being small compared to the area thereof the wall members of said air chamber being of relatively extended area and extending substantially the full height of said container so as to provide for quick response of the pressure in the said air chamber to the average temperature of liquid in the container, heating means for said container and controlling means for said heating means connected to said air chamber and adapted to be operated in response to the pressure therein to control said heating means.

2. An electrical heating device for liquids comprising a container, electrical heating means mounted in position to heat the liquid in the container, an air chamber mounted in heat-conducting relation with respect to the liquid in the container and the surrounding air, fluid pressure responsive means connected to said air chamber and adapted to be operated by changes of pressure in said air chamber due to variations of temperature of said fluid said air chamber extending substantially throughout the height of the container and having an extending wall portion in heat conducting relation with the liquid in the container throughout the height of said liquid so as to be responsive to the average change in temperature of the liquid in the container and electrical energizing connections for said electrical heating means controlled by said pressure responsive means so as to control the operation of the electrical heating means responsively to variations of temperature in the liquid in the container.

In testimony whereof we have hereunto subscribed our names this 8th day of June, 1928.

IDA R. McGOWEN.
FRANCIS J. McGOWEN.